Patented July 30, 1929.

1,722,775

UNITED STATES PATENT OFFICE.

FREDERICK C. WEBER, OF TUCKAHOE, NEW YORK, AND WALTER H. RANDALL, OF PEKIN, ILLINOIS, ASSIGNORS TO THE FLEISCHMANN COMPANY, OF NEW YORK, N. Y., A CORPORATION OF OHIO.

MALTOSE PROCESS AND PRODUCT.

No Drawing. Application filed February 20, 1926. Serial No. 89,665.

This invention relates to maltose products and a process of producing the same and has as a general object the production of a product of high quality in a convenient, efficient and economical manner.

In its more specific aspects on of the objects of this invention is to provide a product having improved color, flavor and keeping qualities and which is adapted for use either as a syrup or in the making of confectionary, bread or other food products in which such materials are employed.

Other objects of the invention will in part be obvious and will in part appear hereinafter.

The invention accordingly comprises the several steps and the relation and order of one or more of such steps with respect to each of the others, and the product possessing the features, properties, and the relation of constituents, which are exemplified in the following detailed disclosure, and the scope of the application of which will be indicated in the claims.

Although numerous processes of manufacturing maltose syrups and malt extracts have been suggested and used, many of these have been inefficient and impractical, either in that the practice thereof involved high operating expense, for example, incomplete conversion of the starch into sugars or the use of relatively large proportions of malt, or the product produced thereby was of such composition, color, flavor and keeping quality as to limit the uses to which it could be satisfactorily applied.

In the practice of the present invention such undesirable results are avoided and a product of high quality is attained by the proper coordination of the various steps of procedure and control which will be pointed out hereinafter.

The improved process utilizes as a carbohydrate source starch, either as such or in the form of ground and preferably degerminated amylaceous substances such as cereals. The starch is first gelatinized, preferably by preparing a "starch milk" of a suitable strength, as for example about 25%—30% solids, adding thereto from 1% to 2% of malt, (based on the solids in suspension) and heating moderately. The malt may be added either in the form of ground barley malt or an infusion thereof and the quantity used will depend on the strength of the starch solution and the rapidity of the liquefaction desired. The heating is best effected by raising the temperature slowly to about 60°—70° C., and maintaining it at the latter temperature for from 1 to 2 hours, whereupon a more or less limpid solution is obtained. After this treatment the temperature may be slowly raised to the boiling point and the mixture boiled for about thirty minutes to one hour, or the mixture may be cooked under pressure for an equivalent time, in order thoroughly to disperse the hemi-celluloses and liquefy the starch grains which are thereby liberated.

The saccharification of the mixture may be next accomplished by cooling the mixture to a temperature of about 60°—65° C., and adding a quantity of barley malt, or an infusion thereof, for example, about 5% to 10%, based on the weight of the starch, the amount used again depending upon the strength of the original starch solution and the rapidity with which the saccharification is desired, and the degree of color which it imparts to the syrup.

In the heretofore known methods of preparing maltose products, a relatively much larger quantity of malt is used than is here specified, and the saccharification has been allowed to proceed. It has been found, however, that in such practice, the conversion of the starch ends at a point at which all of the starch has not been completely converted into sugars and the resulting product therefore contains considerable amounts of intermediate products, particularly of the dextrin class.

It has also been found that, although the product has a considerable protein content relative to its sugar content, nevertheless these nitrogenous substances are largely of a character such that when the product is used in bread making, they are not utilized to the utmost either in respect to assimilation by the yeast or in the formation of desirable crust color, and that their presence in such quantities does not proportionately increase the value of the product as a bread dough ingredient.

A novel and important feature of the present invention is therefore that at this point there is added to the mash an amount of yeast proportioned according to the amounts of other materials present, and depending upon the amount of extractives which are obtained therefrom, principally nitrogenous in nature, and which it is desired to impart to the finished product. The term "yeast" in the present application means particularly those yeasts used in the industries of brewing, distilling, wine-making and bread manufacture, although it is to be understood that any of the "true Saccharomycetes" described on page 316 et seq. of the 1911 edition of Alfred Jörgensen's "Micro-Organisms and Fermentation" may be used. The term is also intended to include extracts of such yeasts. Because of its uniformity, purity and freedom from undesirable color and flavor, bakers' yeast is to be preferred.

This yeast serves not only to activate the malt diastase, thereby insuring a more efficient and complete conversion of the starch into sugars, but also serves to supply to the resulting product a properly proportioned amount of substances of a protein nature which are of such an available character that they are efficiently and readily utilized in bread making in both of the aspects mentioned above. In other words it is found that the composition of the new product is such that when it is used as a bread dough ingredient, a loaf of exceptional quality results, having excellent volume and markedly improved crust color, texture and flavor and a brighter and whiter interior color than is obtainable with the ordinary and darker colored malt extracts previously obtainable on the market. The quantity of yeast required for these purposes may vary considerably, as, for example, from about 8% to 30%, based on the weight of the starch.

At this point it is also desirable to adjust the hydrogen-ion concentration of the mixture to a pH of from 4.5 to 5 and preferably to a pH of 4.8 which is apparently the optimum for diastatic activity. The mash is then kept at a temperature of from 60°—65° C., for a time sufficient to permit a more or less complete saccharification, i. e., for from 36 to 60 hours.

After the saccharification is completed, the mash is filtered, preferably by the addition of 5% to 10% of filter-cel and evaporated to the desired consistency as for example, about 78% to 80% solids, in the usual manner, in single or multiple effect evaporators. The evaporation may be accomplished with particular ease and with less tendency of coloration for the reason that in the present process starch suspensions of much higher concentrations than heretofore may be used with the certainty that the saccharification of the starch will nevertheless be complete, and the combined filtered syrup and wash waters are therefore initially of a concentration of from 18% to 30% solids.

The concentrated syrup is of a light amber color and mild flavor and high nutritive value and may be used, if desired, as a table syrup. Moreover, as indicated above, the product may be used with benefit in making bread, in any proportions desired. For such latter purpose, the product may, if desired, be acidified with lactic acid to about 1% acidity.

The superiority of the product in the respects of color, completeness of starch conversion to sugars and absence of intermediate products can probably best be illustrated by the following comparative table showing an analysis thereof and an average analysis of a typical commercial malt extract now in common use:

|  | Old product. | New product. |
|---|---|---|
| Water | 23.00 | 18.31 |
| Protein | 6.39 | 1.85 |
| Ash | 1.36 | 0.39 |
| Acidity (as lactic) | 1.00 | 0.83 |
| Diastase (Lintner) | 1.50 | 0.75 |
| Color (Stammer's scale) | 25.00 | 178.00 |
| Maltose | 63.50 | 76.80 |
| Dextrin | 10.00 | 1.00 |

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Having described our invention, what we claim as new and desire to secure by Letters Patent, is:

1. In a process of manufacturing maltose products, the improvement which comprises diastatically saccharifying starch in the presence of yeast of the true Saccharomycetes type.

2. In a process of manufacturing maltose products, the improvement which comprises diastatically saccharifying starch with a relatively small percentage of malt in the presence of a relatively large percentage of yeast of the true Saccharomycetes type.

3. In a process of manufacturing maltose products, the improvement which comprises diastatically saccharifying a relatively concentrated starch paste with about 10% malt in the presence of about 8% to 30% yeast of the true Saccharomycetes type.

4. A process of manufacturing maltose products which comprises preparing a relatively concentrated starch material, adding thereto a small proportion of malt, heating the mixture to gelatinize the same and subsequently adding more malt and a relatively large percentage of yeast of the true Saccharomycetes type, and maintaining the mash at a temperature suitable for saccharification.

5. A process of manufacturing maltose products which comprises preparing a starch material containing about 30% solids, adding thereto about 2% malt, heating the mixture to about 70° C., to gelatinize the starch, cooling the mixture to about 60°—65° C., and adding thereto about 5% to 10% malt and 8% to 30% yeast of the true Saccharomycetes type, maintaining the temperature at about 65° C., until saccharification is completed, and filtering and concentrating the resultant syrup.

6. As an article of manufacture, a starch conversion product of the maltose type having a high maltose and a readily utilizable nitrogen content and being relatively free from intermediate starch conversion products, and such as is prepared by the diastatic conversion of starch in the presence of yeast of the true Saccharomycetes type.

7. As an article of manufacture, a starch conversion product of the maltose type having a high maltose and a readily utilizable nitrogen content and being relatively free from intermediate starch conversion products, and such as is prepared by diastatically saccharifying a relatively concentrated starch solution by the use of about 10% of malt and 8% to 30% of yeast of the true Saccharomycetes type.

In testimony whereof we affix our signatures.

FREDERICK C. WEBER.
WALTER H. RANDALL.